US011026105B1

United States Patent
Moon et al.

(10) Patent No.: US 11,026,105 B1
(45) Date of Patent: Jun. 1, 2021

(54) FINGERPRINT-BASED BEAM INTERFERENCE CANCELLATION SYSTEM AND METHOD THEREOF

(71) Applicant: INDUSTRY FOUNDATION OF CHONNAM NATIONAL UNIVERSITY, Gwangju (KR)

(72) Inventors: Sangmi Moon, Gwangju (KR); Hyeonsung Kim, Jeollanam-do (KR); Intae Hwang, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 16/950,552

(22) Filed: Nov. 17, 2020

(30) Foreign Application Priority Data

Jul. 28, 2020 (KR) .......................... 10-2020-0093492

(51) Int. Cl.
*H04B 15/00* (2006.01)
*H04W 24/02* (2009.01)
(Continued)

(52) U.S. Cl.
CPC .......... *H04W 24/02* (2013.01); *H04B 7/0408* (2013.01); *H04B 15/00* (2013.01); *H04W 4/029* (2018.02)

(58) Field of Classification Search
CPC .. H04W 24/02; H04W 24/029; H04B 7/0408; H04B 15/00
(Continued)

(56) References Cited

U.S. PATENT DOCUMENTS

| 2014/0064126 A1* | 3/2014 | Lim ...................... G01S 5/0257 370/252 |
| 2014/0120931 A1* | 5/2014 | Shin ...................... H04W 64/00 455/452.1 |
| 2016/0337888 A1* | 11/2016 | Zhang ...................... G06T 17/05 |

FOREIGN PATENT DOCUMENTS

| KR | 20130018908 A | 2/2013 |
| WO | 2011155451 A1 | 12/2011 |

OTHER PUBLICATIONS

Zhang et al. (Position Fingerprint-Based Beam Selection in MillimeterWave Heterogeneous Networks, School of Communication and Information Engineering, Chongqing University of Posts and Telecommunications, Jul. 14, 2017) (Year: 2017).*

(Continued)

*Primary Examiner* — Ted M Wang
(74) *Attorney, Agent, or Firm* — Levenfeld Pearlstein, LLC

(57) ABSTRACT

A fingerprint-based beam interference cancellation system and a method thereof are proposed. A communication part receives location information and reference signal reception power which is strength of a received signal provided from each user terminal in response to a reference signal, a fingerprint DB construction part constructs a fingerprint database by receiving the reference signal reception power and the location information, a group-based fingerprint DB construction part constructs a group-based fingerprint database by grouping user terminals, aligning the remaining beams, generating group fingerprint data with the aligned beams, and using the generated group fingerprint data, a first beam interference cancellation part generates a beam set for each group from which beam interference within the group is cancelled, and a second beam interference cancellation part removes beams redundant between the groups and cancels intra-group and inter-group beam interference in (Continued)

millimeter wave communication, thereby improving reliability and data transfer rate.

6 Claims, 5 Drawing Sheets

(51) Int. Cl.
*H04W 4/029* (2018.01)
*H04B 7/0408* (2017.01)

(58) Field of Classification Search
USPC .......................................................... 375/267
See application file for complete search history.

(56) References Cited

OTHER PUBLICATIONS

Zhang, Zufan, Position Fingerprint-Based Beam Selection in Millimeter Wave Heterogeneous Networks, Sensors, 2017, pp. 1-15, vol. 17, MDPI, Switzerland.

* cited by examiner

US 11,026,105 B1

FINGERPRINT-BASED BEAM INTERFERENCE CANCELLATION SYSTEM AND METHOD THEREOF

CROSS REFERENCE TO RELATED APPLICATION

The present application claims priority to Korean Patent Application No. 10-2020-0093492, filed Jul. 28, 2020, the entire contents of which is incorporated herein for all purposes by this reference.

BACKGROUND OF THE INVENTION

Field of the Invention

The present disclosure relates to a fingerprint-based beam interference cancellation system and a method thereof and, more particularly, to a technology in which at least one of intra-group and inter-group beam interference is cancelled by using fingerprint data, so that communication is performed by the best beam from which the beam interference has been cancelled, thereby improving data transfer rate and reliability.

Description of the Related Art

Telecommunications and various industries are eager to introduce 5G services that support the next-generation networks having ultra-large scale and ultra-low latency. The 5G service may be described in terms of eMBB (Enhanced Mobile Broad Band), which aims at high transmission speed, and URLLC (Ultra Reliable and Low Latency Communication), which increases reliability and dramatically shortens latency. In particular, a requirement for eMBB is that a maximum transmission rate based on a downlink is 20 Gbps, which is about 20 times higher than that of the existing LTE, so that a perceived transmission speed of a user terminal will be 100 to 1000 Mbps. As part of a technology to meet such a requirement, a millimeter wave transmission system is in the spotlight.

The millimeter wave band refers to a 30 to 300 GHz band whose wavelength is in mm units that are distinguished from a band below 6 GHz used in conventional mobile communication. Since the millimeter wave has short wavelength due to its high frequency, a large number of antennas may be integrated in a small space, thereby being suitable for massive multiple-input multiple-output (MIMO) systems. In addition, massive MIMO is capable of effectively improving data transmission speed and link reliability, and improving energy efficiency and spectrum efficiency by three times and one to two times, respectively. When millimeter wave and massive MIMO are used together, each disadvantage may be effectively overcome and its advantages may be fully utilized.

Recent research shows the potential of millimeter wave massive MIMO for 5G wireless systems.

However, the millimeter wave has disadvantages such as attenuation of a signal and a reduction in transmission distance because of the short wavelength due to its high frequency. In order to solve this problem, a millimeter wave system is applied by a highly directional beamforming technology.

The Beamforming technology selects the best beam to maximize transmission speed and improve energy efficiency. All common millimeter wave beam selection algorithms are based on estimating complete channel state information (CSI), and accurate channel estimation and CSI feedback for a base station are required. As an easy and effective method for the channel estimation, there is provided an exhaustive beam search in which, while sequentially replacing directional analog beams, a transmitter and a receiver search for a pair of transmit/receive beams that maximize a signal-to-noise ratio (SNR) of a link. Such an approach has been used in IEEE standard 802.11ad systems and 5G systems, etc.

This method is determined by grid resolution and has a disadvantage in that a large overhead occurs because all beams for a transmitter and receiver need to be sequentially transmitted. In order to overcome the overhead disadvantage, a CS (Compressed Sensing)-based channel estimation technique utilizing a sparsity property of the millimeter wave channel has been proposed, and a beam search process may be accelerated by position or direction estimation.

However, one of the major problems in implementing a millimeter wave massive MIMO system is complexity of the hardware. Since one RF chain is required for each antenna, the implementation complexity is high. In addition, since power consumption of the RF chain in millimeter wave is much higher than that in 6 GHz, it is virtually impossible to have a large number of RF chains.

Recently, in order to reduce hardware cost and power consumption, studies on millimeter wave massive MIMO using a lens antenna array has been conducted. By using the lens antenna array in the transmitter, a spatial channel may be represented as a beamspace.

The millimeter wave has high directionality and has only a small number of directions, so the beamspace channel has sparsity. Since each beam in the beamspace corresponds to a single RF chain, it is possible to reduce the number of RF chains without causing significant loss in sum-rate performance by appropriately selecting a small number of beams. In this regard, accurate beam selection is essential in beam-based millimeter wave communication. An improved spatial division multiple access (SDMA) has been proposed, and a base station selects several beams that capture a main lobe of a channel in order to approximate a high-dimensional channel, thereby reducing feedback. This method overcomes the difficulty of obtaining downlink CSI in a millimeter wave massive MIMO system, yet the method needs to take into account computational complexity and feedback design. A magnitude maximization-based beam selection (MM-BS) has been proposed, and a base station selects several beams having a large magnitude for each user terminal. Although the MM-BS is simple, since the same beam may be selected by different RF chains, there occurs a problem in that interference is generated between multiuser terminals.

SUMMARY OF THE INVENTION

The present disclosure may provide a fingerprint-based beam interference cancellation system and a method thereof that are capable of improving data transfer rate and reliability in communication by cancelling at least one of intra-group and inter-group beam interference on the basis of fingerprint data formed in communication between a base station and at least one user terminal.

A fingerprint-based beam interference cancellation system according to an aspect of the present disclosure may include: a base station; and at least one user terminal communicating with the base station, wherein the base station may include: a communication part receiving location information and reference signal reception power which is strength of a received signal provided from each user terminal in response to a reference signal transmitted to at least one user terminal; a fingerprint DB construction part that constructs a fingerprint database by receiving the reference signal reception power and the location information, selecting a beam having a highest received signal strength for each location of each user terminal, and generating fingerprint data from the selected beam and remaining beams; a group-based fingerprint DB construction part that constructs a group-based fingerprint database by grouping user terminals having a same received signal strength as the selected beam, aligning the remaining beams except for the selected beam for each user terminal according to the received signal strength, generating group fingerprint data with the aligned beams, and using the generated group fingerprint data; and a first beam interference cancellation part generating a beam set for each group from which beam interference within the group is cancelled by constituting the beam set for each group from a beam index having the highest received signal strength in the group fingerprint data.

Preferably, the base station may further include a second beam interference cancellation part sequentially removing redundant beams according to an order of the beams aligned in the beam set of any group when the beam in the beam set of any group and the beam in the beam set of another group are overlapped, and generating a beam set in which beam interference between groups is cancelled.

A fingerprint-based beam interference cancellation system according to another aspect of the present disclosure may include: a base station; and at least one user terminal communicating with the base station, wherein the base station may include: a communication part receiving location information and reference signal reception power which is strength of a received signal provided from each user terminal in response to a reference signal transmitted to at least one user terminal; a fingerprint DB construction part that constructs a fingerprint database by receiving the reference signal reception power and the location information, selecting a beam having a highest received signal strength for each location of each user terminal, and generating fingerprint data from the selected beam and remaining beams; a group-based fingerprint DB construction part that constructs a group-based fingerprint database by grouping user terminals having a same received signal strength as the selected beam, aligning the remaining beams except for the selected beam for each user terminal according to the received signal strength, generating group fingerprint data with the aligned beams, and using the generated group fingerprint data; and a second beam interference cancellation part sequentially removing redundant beams according to an order of the aligned beams of any group when the aligned beams of any group and the aligned beams of another group are overlapped in the group fingerprint data, and generating a beam set in which beam interference between groups is cancelled.

In a fingerprint-based beam interference cancellation method performed in a fingerprint-based beam interference cancellation system including a base station and at least one user terminal communicating with the base station according to another aspect of the present disclosure, the method may include: communicating by receiving location information and reference signal reception power which is strength of a received signal provided from each user terminal in response to a reference signal transmitted to at least one user terminal; constructing a fingerprint DB by constructing a fingerprint database by receiving the reference signal reception power and the location information, selecting a beam having a highest received signal strength for each location of each user terminal, and generating fingerprint data from the selected beam and remaining beams; constructing a group-based fingerprint DB by constructing a group-based fingerprint database by grouping user terminals having a same received signal strength as the selected beam, aligning the remaining beams except for the selected beam for each user terminal according to the received signal strength, generating group fingerprint data with the aligned beams, and using the generated group fingerprint data; and cancelling a first beam interference by constituting a beam set for each group from a beam index having the highest received signal strength in the group fingerprint data, and generating a beam set for each group in which beam interference within the group is cancelled.

Preferably, the fingerprint-based beam interference cancellation method may further include: cancelling a second beam interference by sequentially removing redundant beams according to an order of the beams aligned in the beam set of any group when the beam in the beam set of any group and the beam in the beam set of another group are overlapped, and generating a beam set in which beam interference between groups is cancelled.

In a fingerprint-based beam interference cancellation method performed in a fingerprint-based beam interference cancellation system including a base station and at least one user terminal communicating with the base station according to another aspect of the present disclosure, the method may include: communicating by receiving location information and reference signal reception power which is strength of a received signal provided from each user terminal in response to a reference signal transmitted to at least one user terminal; constructing a fingerprint DB by constructing a fingerprint database by receiving the reference signal reception power and the location information, selecting a beam having a highest received signal strength for each location of each user terminal, and generating fingerprint data from the selected beam and remaining beams; constructing a group-based fingerprint DB by constructing a group-based fingerprint database by grouping user terminals having a same received signal strength as the selected beam, aligning the remaining beams except for the selected beam for each user terminal according to the received signal strength, generating group fingerprint data with the aligned beams, and using the generated group fingerprint data; and cancelling a second beam interference by sequentially cancelling redundant beams according to an order of the aligned beams of any group when the aligned beams of any group and the aligned beams of another group are overlapped in the group fingerprint data, and generating a beam set in which beam interference between groups is cancelled.

According to the present disclosure, in millimeter wave communication, as at least one of intra-group and inter-group beam interference is cancelled using fingerprint data, communication is performed by the best beam in which the beam interference between user terminals has been cancelled, thereby improving data transfer rate and reliability.

DETAILED DESCRIPTION OF THE INVENTION

Figure 1:
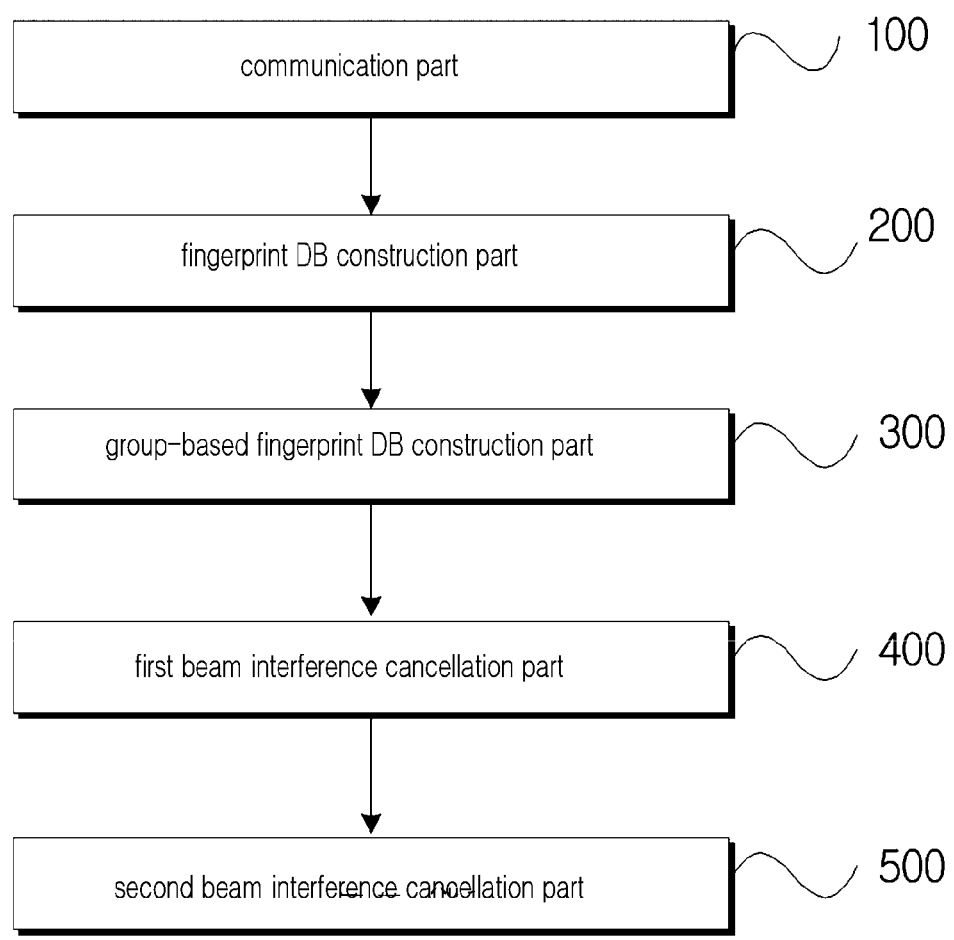
FIG. 1 is a block diagram of a system device for cancelling fingerprint-based beam interference according to an exemplary embodiment.

Hereinafter, a fingerprint-based beam interference cancellation system and a method thereof according to the present disclosure will be described in detail with reference to the accompanying drawings. In this process, the thickness of the lines or the size of components shown in the drawings may be exaggerated for clarity and convenience of description. In addition, terms to be described later are terms defined in consideration of functions in the present disclosure and may vary according to the intentions or practices of the users or operators. Therefore, definitions of these terms should be made based on the contents throughout the present specification.

Objectives and effects of the present disclosure may be naturally understood or more clearly understood by the following description, and the objectives and effects of the present disclosure are not limited only by the following description. In addition, in describing the present disclosure, when it is determined that a detailed description of a known technology related to the present disclosure may unnecessarily obscure the subject matter of the present disclosure, the detailed description thereof will be omitted.

A multi-input multi-output (MIMO) network system takes into account a millimeter wave massive MIMO system composed of a single base station and a plurality of single antenna user terminals. The base station may have a plurality of antennas and $N_{RF}$ numbers of RF chains.

At this time, received signals y of all user terminals k in a spatial domain may be expressed by Equation 1 below.

$$y = H^H P s + w \qquad \text{[Equation 1]}$$

In Equation 1, $H=[h_1, h_2, \ldots, h_k] \in C^{N \times K}$ is a channel matrix, and $h_k \in C^{N \times 1}$ is a channel vector between a base station and user terminal k. $P \in C^{N \times K}$ is a digital precoding matrix, and $s \in C^{K \times 1}$ is a symbol vector that satisfies $E[ss^H]=I_K$. The precoding symbol is limited to (x=Ps) $E[\|x\|^2] \leq \rho$. $w \sim CN(0, \sigma^2 I_K)$ is white Gaussian noise.

According to the Saleh-Valenzuela channel model widely used in millimeter wave communication, a channel vector $h_k$ may be expressed by Equation 2 below.

$$h_K = \sqrt{\frac{N}{L+1}} \sum_{l=0}^{L} \beta_k^l \alpha(\phi_k^l, \theta_k^l) \qquad \text{[Equation 2]}$$

In Equation 2, in the complex gain of an antenna steering vector, $\beta_k^0 a(\phi_k^0, \theta_k^0)$ is a component of Line of Sight (LOS), which is a visible distance, and $\beta_k^l(\phi_k^l, \theta_k^l)$, l=1, ..., L is a l-th component of non-Line-of-Sight (NLOS), which is a l-th invisible distance. β, φ and θ are respectively complex gain, azimuth, and elevation angles, and a(φ,θ) is an antenna steering vector.

In the case of a UPA (Uniform Planner Array), which is $N_h \times N_v (=N)$, the antenna steering vector a(φ,θ) may be expressed by Equation 3 below.

$$a(\phi, \theta) = a_{az}(\phi) \otimes a_{el}(\theta) \qquad \text{[Equation 3]}$$

In Equation 3, a horizontal antenna steering vector is $$a_{az}(\phi) = \frac{1}{\sqrt{N_h}} [e^{-j2\pi\phi i}],$$

where arbitrary I satisfies $i \in I(N_h)$, and a vertical antenna steering vector is $$a_{el}(\theta) = \frac{1}{\sqrt{N_v}} [e^{-j2\pi\theta j}],$$

where arbitrary j satisfies $j \in I(N_v)$ and I(n)={1−(n−1)/2:l=0, 1, ..., n−1}. A spatial azimuth angle is defined as $$\phi \triangleq \frac{d_h}{\lambda} \sin\tilde{\phi},$$

and a spatial elevation angle is defined as $$\theta \triangleq \frac{d_v}{\lambda} \sin\tilde{\theta},$$

where $\tilde{\phi}$ is defined as a physical azimuth angle, $\tilde{\phi}$ is defined as a physical elevation angle, λ is defined as a wavelength, $d_h$ is defined as a horizontal antenna distance, $d_v$ is defined as a vertical antenna distance, and $d_h = d_v = \lambda/2$ is defined as in millimeter wave frequency.

A spatial domain channel may be directly transformed into a beamspace domain by using a lens antenna array.

The lens antenna array is an N×N-sized spatial discrete Fourier transform (DFT) matrix U, and may be defined by Equation 4 below.

$$U = [a(i/N_h, j/N_v)]_{i \in I(N_h), j \in I(N_v)}^H \qquad \text{[Equation 4]}$$

In Equation 4, $i/N_h$ and $i \in I(N_h)$ are azimuth angles predefined by a horizontal lens antenna array, and $j/N_v$ and $j \in I(N_v)$ are elevation angles predefined by a vertical lens antenna array.

Finally, a received signal vector f in the beamspace system may be expressed by Equation 5 below.

$$\tilde{y} = H^H U^H P s + w = \tilde{H}^H P s + w \qquad \text{[Equation 5]}$$

In Equation 5, a beamspace channel matrix H may be expressed by Equation 6 below.

$$\tilde{H} = [\tilde{h}_1, \tilde{h}_2, \ldots, \tilde{h}_k] = UH = [Uh_1, Uh_2, \ldots, Uh_k] \qquad \text{[Equation 6]}$$

In Equation 6, $Uh_k$ is a beamspace channel vector of user terminal k. In Equation 2, the number L is much less than the number N of NLOS components, and constitutes the beamspace channel vector $\tilde{h}_k$ having sparsity. By selecting only a small number of appropriate beams according to sparse beamspace channel vectors, the dimension of the MIMO system may be reduced without loss of performance. Finally, the received signal vector f may be expressed by Equation 7 below.

$$\tilde{y}=\tilde{H}_b{}^H P_b s+w \qquad \text{[Equation 7]}$$

In Equation 7, $\tilde{H}_b=\tilde{H}(s,:)_{s\in B}$, where B is selected beam indexes, and $P_b$ is a dimension-reduced digital precoding matrix. Since the dimension of $P_b$ is much less than that of the digital precoding matrix P of Equation 1, the number of RF chains may be significantly reduced. At this time, the minimum number of RF chains required to guarantee a spatial multiplexing gain of user terminal k is $N_{RF}=K$.

A fingerprint represents some properties of a channel at a designated location. With such properties, it is possible to know characteristics of strength of signals received from different base stations or a multipath channel at the base stations. The fingerprint refers to a set of beam indexes transmitted from a given location, and may be defined as a group-based fingerprint according to a data storage method.

Beam interference cancellation using fingerprint data may be divided into an offline step and an online step.

In the offline step, fingerprint data is generated to cancel beam interference, and in the online step, intra-group and inter-group beam interference may be cancelled based on the generated fingerprint data.

FIG. 1 is a block diagram of a system device for cancelling fingerprint-based beam interference according to an exemplary embodiment.

As shown in FIG. 1, a system for cancelling beam interference on the basis of a fingerprint according to the exemplary embodiment may include: a communication part 100; a fingerprint DB construction part 200; a group-based fingerprint DB construction part 300; a first beam interference cancellation part 400; and a second beam interference cancellation part 500.

In order to build the fingerprint, the communication part 100 may periodically transmit a reference signal (RS) to at least one user terminal through a codebook composed of a unit matrix vector to quantize channel information by beam sweeping based on an exhaustive search in a base station. The user terminal measures the received reference signals, and transmits reference signal reception power, which is the strength when received, together with location information of the user terminal to the base station in return. At this time, the reference signal reception power transmitted from the user terminal to the base station is a beam index having maximum received signal strength at the location of the user terminal.

Figure 2:
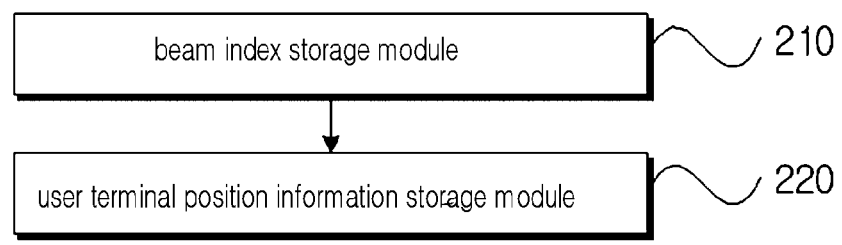
FIG. 2 is a detailed block diagram of a fingerprint DB construction part according to the exemplary embodiment.

FIG. 2 is a detailed block diagram of a fingerprint DB construction part 200 according to the exemplary embodiment.

As shown in FIG. 2, the fingerprint DB construction part 200 may be composed of a beam index storage module 210 and a user terminal location information storage module 220, and the beam index storage module 210 may store reference signal reception power provided from user terminals, and the user terminal location information storage module 220 may receive and store location information. At this time, in the reference signal received power, only the beam having the highest signal strength (TOP-M) is stored, and the location information of the user terminal may be easily known by a built-in GPS (Global Positioning System) or a network positioning system. Table 1 shows an example of a fingerprint.

TABLE 1

Example of fingerprint database

| Position | Best | $2^{nd}$ best | ... | $m^{th}$ best | ... | $M^{th}$ best |
|---|---|---|---|---|---|---|
| $P_1$ | $b_1^1$ | $b_1^2$ | ... | $b_1^m$ | ... | $b_1^M$ |
| $P_2$ | $b_2^1$ | $b_2^2$ | ... | $b_2^m$ | ... | $b_2^M$ |
| ... | ... | ... | ... | ... | ... | ... |
| $P_u$ | $b_u^1$ | $b_u^2$ | ... | $b_u^m$ | ... | $b_u^M$ |
| ... | ... | ... | ... | ... | ... | ... |
| $P_U$ | $b_U^1$ | $b_U^2$ | ... | $b_U^m$ | ... | $b_U^M$ |

Here, Pu is a position u of a user terminal, where u=1,2, ..., U, and $b_u^m$ is a beam having a high strength of the m-th received signal at the position u of the user terminal, where m=1,2, ..., M.

Figure 3:
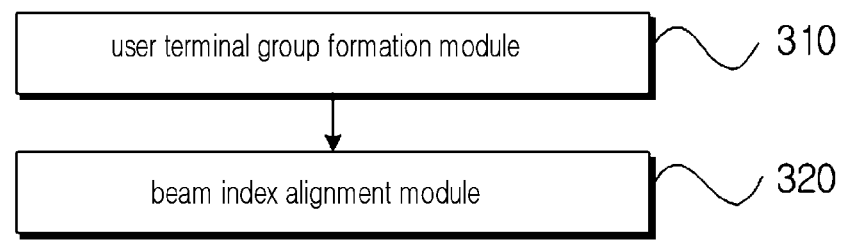
FIG. 3 is a detailed block diagram of a group-based fingerprint DB construction part according to the exemplary embodiment.

FIG. 3 is a detailed block diagram of a group-based fingerprint DB construction part according to the exemplary embodiment.

As shown in FIG. 3, the group-based fingerprint DB construction part 300 may be configured to include a user terminal group formation module 310 and a beam index alignment module 320.

In the group-based fingerprint DB construction part 300, the user terminal group formation module 310 groups user terminals having the same received signal strength in the fingerprint data, the beam index alignment module 320 arranges all beams, except for the beam having the highest received signal strength, for all user terminals of each according to the received signal strength and generates group fingerprint data by using the aligned beams, thereby constructing a group-based fingerprint database from the generated group fingerprint data. At this time, the beam having the highest received signal strength (TOP-M) may be stored, the number of beams or the number of available beams is largely related to the location of the user terminal, and the number of groups may be determined according to serving coverage of a base station.

Table 2 shows an example of a group-based fingerprint. Here, $G_s$ denotes group s, where s=1,2, ..., S, and $b_s^k$ is a beam having the highest strength of the k-th signal of group s, where k=1,2, ..., K.

TABLE 2

Group-based fingerprint database

| Group | Best | $2^{nd}$ best | ... | $k^{th}$ best | ... | $K^{th}$ best |
|---|---|---|---|---|---|---|
| $G_1$ | $b_1^1$ | $b_1^2$ | ... | $b_1^k$ | ... | $b_1^K$ |
| $G_2$ | $b_2^1$ | $b_2^2$ | ... | $b_2^k$ | ... | $b_2^K$ |
| ... | ... | ... | ... | ... | ... | ... |
| $G_s$ | $b_s^1$ | $b_s^2$ | ... | $b_s^k$ | ... | $b_u^K$ |
| ... | ... | ... | ... | ... | ... | ... |
| $G_S$ | $b_S^1$ | $b_S^2$ | ... | $b_S^k$ | ... | $b_U^K$ |

In the online step, a beam selection for beam interference cancellation may be performed to cancel the beam interference on the basis of the group fingerprint data constructed by the group-based fingerprint DB construction part. As the type of interference, there are intra-group and inter-group interference, so that the beam selection may be made in consideration of the interference.

First, in order to cancel the intra-group interference, the first interference cancellation part 400 may select a beam having the highest received signal strength for each user terminal of a group $G_s$. At this time, the intra-group interference may be cancelled by consisting a beam set $B_s=\{b_s^1, b_s^2, \ldots, b_s^k, b_s^{k_s}\}$ for the selected beam.

After cancelling the intra-group interference, in order to remove redundant beams between groups, the second interference cancellation part 500 checks the presence or absence of inter-group beam interference, so that when a beam in the beam set of the group $G_s$ overlaps with a beam in the beam set of other groups, the corresponding beam is deleted from the beam set $B_s$ and the next beam is changed to $b_g^{k_s+1}$, i=1, . . . , I in the fingerprint data. At this time, interference between groups may be cancelled by repeatedly performing I=φ until there is no interference between groups.

<Simulation>

In the exemplary embodiment of the present disclosure, a commercial simulator is designed based on a Wireless Insite and a publicly available Deep MIMO data set, and a channel vector may be generated using parameters such as complex gain, azimuth angle, and elevation angle. The millimeter wave frequency is 60 GHZ, and a base station and a user terminal may each have an 8×8(=$N_H$×$N_V$) UPA antenna and a single antenna. Detailed parameters are shown in Table 3.

TABLE 3

| Parameter | Division |
|---|---|
| Carrier | 60 GHz |
| System bandwidth | 500 MHz |
| Active base station | 4 |
| Active user terminal | From row R1100 to R2000 |
| Number of base station antennas | Mx = 1, My = 8, Mz = 8 |
| User terminal antenna number | Mx = 1, My = 1, Mz = 1 |
| Antenna spacing (wavelength) | 0.5 |
| Number of routes | 5 |

In order to evaluate the beam interference cancellation performance on the basis of the fingerprint according to the exemplary embodiment, it is possible to compare and analyze the sum-rate performance for the existing technology such as Fully digital beamforming (Fully DBF), Random Beam Selection, and Greedy Beam Selection.

In the simulation result according to the exemplary embodiment of the present disclosure, a location of the user terminal is matched with a group in the group-based fingerprint database. In the matching process, a beam is selected to constitute a beam set for each group and to cancel the intra-group and inter-group beam interference.

To compare and analyze the performance of beam selection in the analog domain, ZF (Zero-Forcing) is used as a digital precoder.

A dimension-reduced digital precoding matrix $P_b$ may be expressed as $P = a\tilde{H}_b(\tilde{H}_b^H \tilde{H}_b)^{-1}$, where a is a scaling factor that guarantees $E[\|x\|^2]=\rho$. ρ is transmission power of a base station, and is the same as the signal-to-noise ratio (SNR) for $\sigma^2=1$. Therefore, a scaling factor α may be expressed by Equation 8 below.

$$\alpha = \sqrt{\frac{\rho}{tr\left((\tilde{H}_b^H \tilde{H}_b)^{-1}\right)}} \quad \text{[Equation 8]}$$

When the same power allocation scheme is used in the base station, an average transmission rate of the k-th user terminal may be expressed by Equation 9 below.

$$R_k = \log_2\left(1 + \frac{|\alpha|^2}{\sigma^2 K}\right) [bps/Hz] \quad \text{[Equation 9]}$$

In Equation 9, a sum-rate is $$R = \sum_{k=1}^{K} R_k.$$

Figure 4:
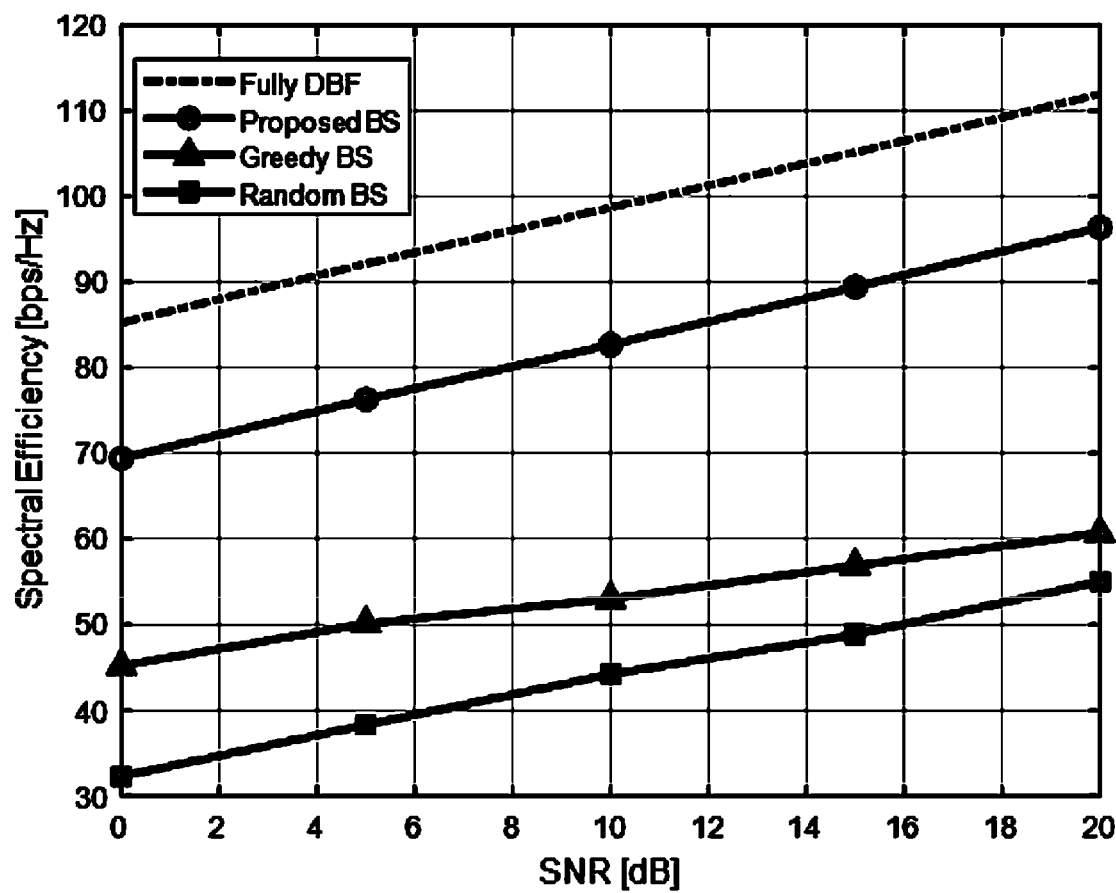
FIG. 4 is a graph comparing sum-rate performance with that of a conventional technology when the number of user terminals k=8 in the fingerprint-based beam interference cancellation system according to the exemplary embodiment.

FIG. 4 is a graph comparing sum-rate performance with that of a conventional technology when the number of user terminals k=8 in the fingerprint-based beam interference cancellation system according to the exemplary embodiment.

In the exemplary embodiment of the present disclosure, unlike the conventional technology, the fingerprint-based beam interference cancellation has higher sum-rate performance than that of the conventional technology because the same beam may not be selected for different user terminals.

Therefore, through selecting a beam by using a fingerprint and cancelling interference, the present disclosure solves the problem in that the existing technologies may not provide services to some user terminals, resulting in a loss in sum-rate performance, and ensures that base stations and all user terminals k may be simultaneously serviced with high data transfer rate and reliability.

In order to evaluate a balance between the sum-rate performance and the complexity of the RF chain through the power efficiency value, the evaluation may be calculated by Equation 10 below.

$$\varepsilon_E = \frac{R}{P_t + N_{RF} \cdot P_{RF}}, [bps/Hz/W] \quad \text{[Equation 10]}$$

In Equation 10, R is a sum-rate [bps/Hz], $P_t$ is a transmission power [Watt], and $P_{RF}$ is a power consumed per RF chain [Watt].

In the simulation according to the exemplary embodiment, values of the powers are set to $P_{RF}$=34.4 mW, $P_t$=15 dBm, respectively.

Figure 5:
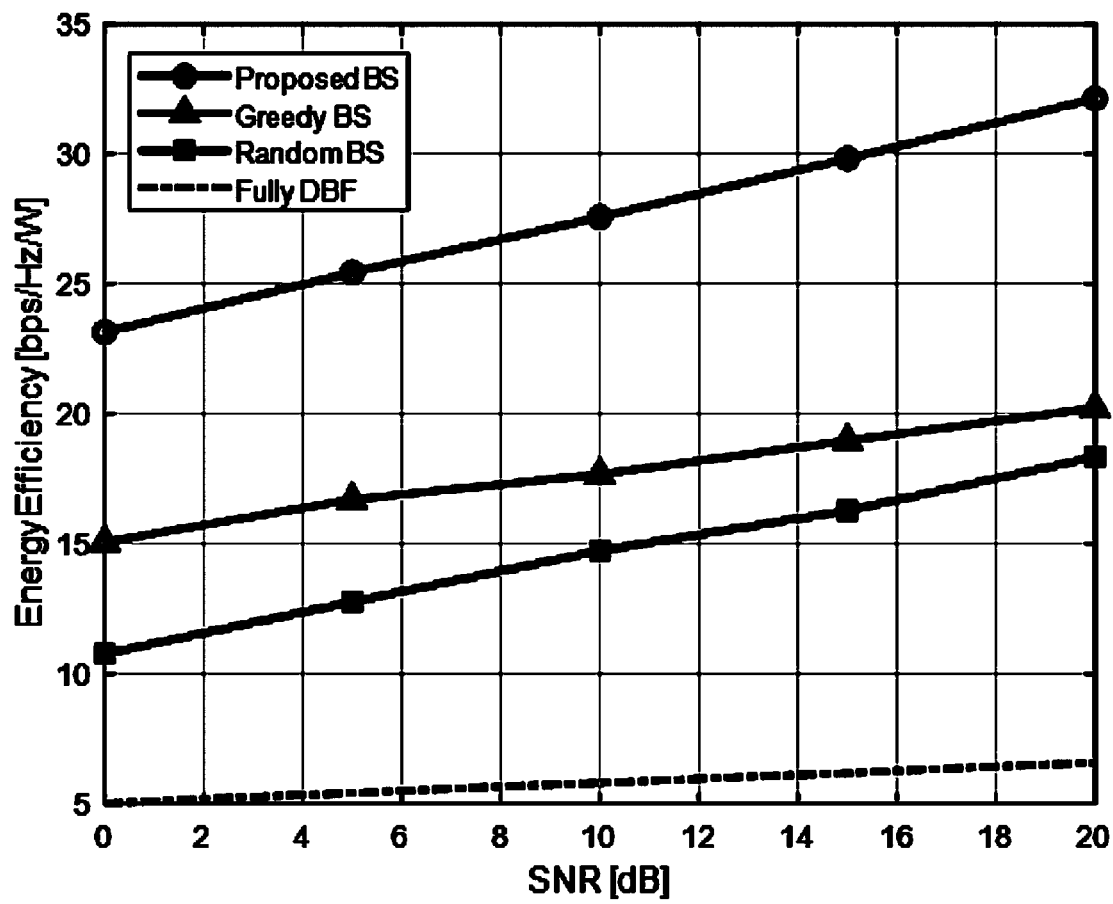
FIG. 5 is a graph comparing energy efficiency performance with that of the conventional technology when the number of user terminals k=8 in the fingerprint-based beam interference cancellation system according to the exemplary embodiment.

FIG. 5 is a graph comparing energy efficiency performance with that of the conventional technology when the number of user terminals k=8 in the fingerprint-based beam interference cancellation system according to the exemplary embodiment.

In the simulation result according to the exemplary embodiment, unlike the conventional technology, the proposed disclosure shows that $N_{RF}$ does not have a fixed value, but has a number less than the number of antennas, so that it may be seen that the power efficiency of the proposed disclosure is higher than that of the existing technology.

Figure 6:
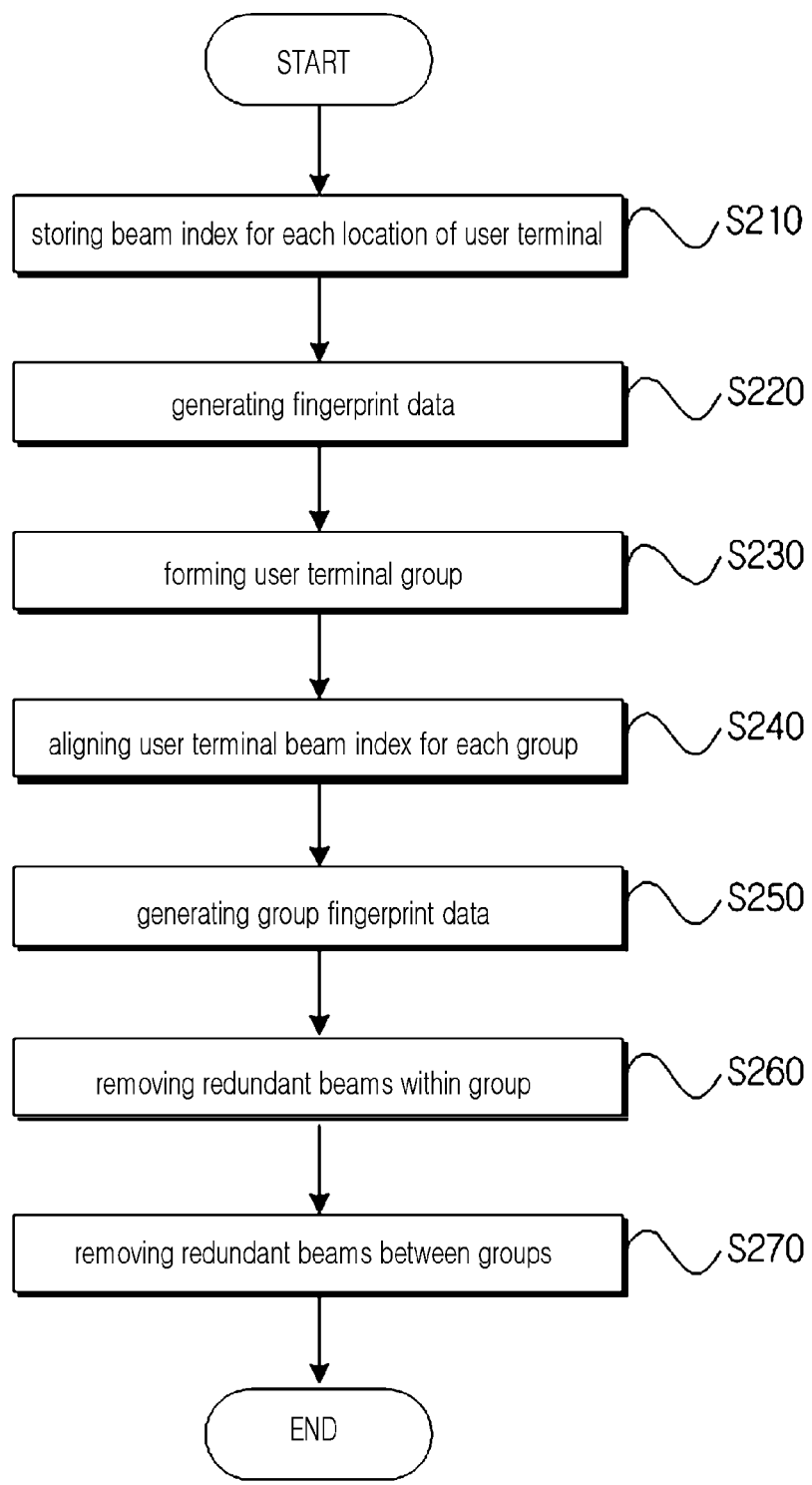
FIG. 6 is a flowchart showing a fingerprint-based beam interference cancellation procedure according to the exemplary embodiment.

FIG. 6 is a flowchart showing a fingerprint-based beam interference cancellation procedure according to the exemplary embodiment.

In a step S210 of storing a beam index for each location of user terminals, the beam index for each location of the user terminals may be stored by receiving the reference signal reception power and location information provided from the user terminals in response to the reference signal transmitted from a base station to at least one user terminal.

In a step S220 of generating fingerprint data, fingerprint data may be generated by selecting a beam having the highest received signal strength from the stored beam index for each location of the user terminals, and using the selected beam and the remaining beams.

In a step S230 of forming a user terminal group, the user terminals provided with the beam having the highest received signal strength in the generated fingerprint data may be grouped.

In a step S240 of aligning the user terminal beam index for each group, the remaining beams except for the beam having the highest received signal strength for all user terminals in each group may be aligned according to the received signal strength.

In a step S250 of generating group fingerprint data, the group fingerprint data may be generated by using the beams aligned with all user terminals in each group.

In a step S260 of removing redundant beams within a group, the redundant beam for the user terminals in each group may be removed by selecting a beam having the highest received signal strength among the beams aligned in each group in the group fingerprint data, and constituting a beam set for the selected beam.

In a step S270 of removing redundant beams between groups, a beam set from which beam interference between groups is cancelled may be generated by sequentially removing the redundant beams according to an order of the aligned beams of a random group when a beam in a beam set in the random group overlaps a beam in a beam set of another group.

Although the present disclosure has been described in detail through the exemplary embodiments above, those skilled in the art to which the present disclosure pertains will understand that various modifications may be made to the above-described exemplary embodiments without departing from the scope of the present disclosure. Therefore, the scope of the present disclosure should not be limited to the described exemplary embodiments, and should be determined not only by the scope of the claims to be described later, but also by any changes or modifications derived from the scope and equivalents of the claims.

What is claimed is:

1. A fingerprint-based beam interference cancellation system comprising:
    a base station; and
    at least one user terminal communicating with the base station, wherein the base station comprises:
    a communication part receiving location information and reference signal reception power which is strength of a received signal provided from each user terminal in response to a reference signal transmitted to at least one user terminal;
    a fingerprint DB construction part that constructs a fingerprint database by receiving the reference signal reception power and the location information, selecting a beam having a highest received signal strength for each location of each user terminal, and generating fingerprint data from the selected beam and remaining beams;
    a group-based fingerprint DB construction part that constructs a group-based fingerprint database by grouping user terminals having a same received signal strength as the selected beam, aligning the remaining beams except for the selected beam for each user terminal according to the received signal strength, generating group fingerprint data with the aligned beams, and using the generated group fingerprint data; and
    a first beam interference cancellation part generating a beam set for each group from which beam interference within the group is cancelled by constituting the beam set for each group from a beam index having the highest received signal strength in the group fingerprint data.

2. The fingerprint-based beam interference cancellation system of claim 1, wherein the base station further comprises a second beam interference cancellation part sequentially removing redundant beams according to an order of the beams aligned in the beam set of any group when the beam in the beam set of any group and the beam in the beam set of another group are overlapped, and generating a beam set in which beam interference between groups is cancelled.

3. A fingerprint-based beam interference cancellation system comprising:
    a base station; and
    at least one user terminal communicating with the base station, wherein the base station comprises:
    a communication part receiving location information and reference signal reception power which is strength of a received signal provided from each user terminal in response to a reference signal transmitted to at least one user terminal;
    a fingerprint DB construction part that constructs a fingerprint database by receiving the reference signal reception power and the location information, selecting a beam having a highest received signal strength for each location of each user terminal, and generating fingerprint data from the selected beam and remaining beams;
    a group-based fingerprint DB construction part that constructs a group-based fingerprint database by grouping user terminals having a same received signal strength as the selected beam, aligning the remaining beams except for the selected beam for each user terminal according to the received signal strength, generating group fingerprint data with the aligned beams, and using the generated group fingerprint data; and
    a second beam interference cancellation part sequentially removing redundant beams according to an order of the aligned beams of any group when the aligned beams of any group and the aligned beams of another group are overlapped in the group fingerprint data, and generating a beam set in which beam interference between groups is cancelled.

4. A fingerprint-based beam interference cancellation method performed in a fingerprint-based beam interference cancellation system comprising a base station and at least one user terminal communicating with the base station, the method comprising:
    communicating by receiving location information and reference signal reception power which is strength of a received signal provided from each user terminal in response to a reference signal transmitted to at least one user terminal;
    constructing a fingerprint DB by constructing a fingerprint database by receiving the reference signal reception power and the location information, selecting a beam having a highest received signal strength for each location of each user terminal, and generating fingerprint data from the selected beam and remaining beams;
    constructing a group-based fingerprint DB by constructing a group-based fingerprint database by grouping user terminals having a same received signal strength as the selected beam, aligning the remaining beams except for the selected beam for each user terminal according to the received signal strength, generating group fingerprint data with the aligned beams, and using the generated group fingerprint data; and cancelling a first beam interference by constituting a beam set for each group from a beam index having the highest received signal strength in the group fingerprint data, and generating a beam set for each group in which beam interference within the group is cancelled.

5. The fingerprint-based beam interference cancellation method of claim 4, further comprising:

cancelling a second beam interference by sequentially removing redundant beams according to an order of the beams aligned in the beam set of any group when the beam in the beam set of any group and the beam in the beam set of another group are overlapped, and generating a beam set in which beam interference between groups is cancelled.

6. A fingerprint-based beam interference cancellation method performed in a fingerprint-based beam interference cancellation system comprising a base station and at least one user terminal communicating with the base station, the method comprising:

communicating by receiving location information and reference signal reception power which is strength of a received signal provided from each user terminal in response to a reference signal transmitted to at least one user terminal;

constructing a fingerprint DB by constructing a fingerprint database by receiving the reference signal reception power and the location information, selecting a beam having a highest received signal strength for each location of each user terminal, and generating fingerprint data from the selected beam and remaining beams;

constructing a group-based fingerprint DB by constructing a group-based fingerprint database by grouping user terminals having a same received signal strength as the selected beam, aligning the remaining beams except for the selected beam for each user terminal according to the received signal strength, generating group fingerprint data with the aligned beams, and using the generated group fingerprint data; and cancelling a second beam interference by sequentially cancelling redundant beams according to an order of the aligned beams of any group when the aligned beams of any group and the aligned beams of another group are overlapped in the group fingerprint data, and generating a beam set in which beam interference between groups is cancelled.

* * * * *